US006767065B2

United States Patent
Heranney

(10) Patent No.: US 6,767,065 B2
(45) Date of Patent: Jul. 27, 2004

(54) ADJUSTABLE ARMREST FOR MOTOR VEHICLE INSIDE PANEL

(75) Inventor: Yves Heranney, Montbeliard (FR)

(73) Assignee: Faurecia Industries, Boulogne Billancourt (FR)

( * ) Notice: Subject to any disclaimer, the term of this patent is extended or adjusted under 35 U.S.C. 154(b) by 0 days.

(21) Appl. No.: 10/089,627

(22) PCT Filed: Aug. 1, 2001

(86) PCT No.: PCT/FR01/02515

§ 371 (c)(1),
(2), (4) Date: Apr. 2, 2002

(87) PCT Pub. No.: WO02/09970

PCT Pub. Date: Feb. 7, 2002

(65) Prior Publication Data

US 2002/0149222 A1 Oct. 17, 2002

(30) Foreign Application Priority Data

Aug. 2, 2000 (FR) .......................................... 00 10214

(51) Int. Cl.⁷ ................................................ A47C 7/54
(52) U.S. Cl. ............................................. 297/411.38
(58) Field of Search ......................... 297/411.21, 411.2, 297/411.35, 411.38, 411.45

(56) References Cited

U.S. PATENT DOCUMENTS

| 1,892,048 | A | | 12/1932 | Genung |
| 2,325,292 | A | | 7/1943 | Westrope |
| 3,038,757 | A | | 6/1962 | Schulze |
| 4,030,748 | A | * | 6/1977 | Brock |
| 4,496,190 | A | * | 1/1985 | Barley |
| 4,619,478 | A | | 10/1986 | Heimnick et al. |
| 4,659,135 | A | | 4/1987 | Johnson |

FOREIGN PATENT DOCUMENTS

DE          40 02 242 A1    8/1991

* cited by examiner

Primary Examiner—Milton Nelson, Jr.
(74) Attorney, Agent, or Firm—Young & Thompson

(57) ABSTRACT

An armrest for an inside wall of a motor vehicle, in particular for a door, the armrest being of elongate shape along a main longitudinal axis, presenting a first end region along the axis, the first end region being connected to the wall by a connection member, wherein the connection member defines a pivoting connection about a substantially horizontal transverse axis enabling the armrest to move angularly relative to the wall, and the armrest includes a locking member co-operating with a stop piece secured to the wall and adapted to hold the armrest in modifiable manner in a selected angular position.

14 Claims, 3 Drawing Sheets

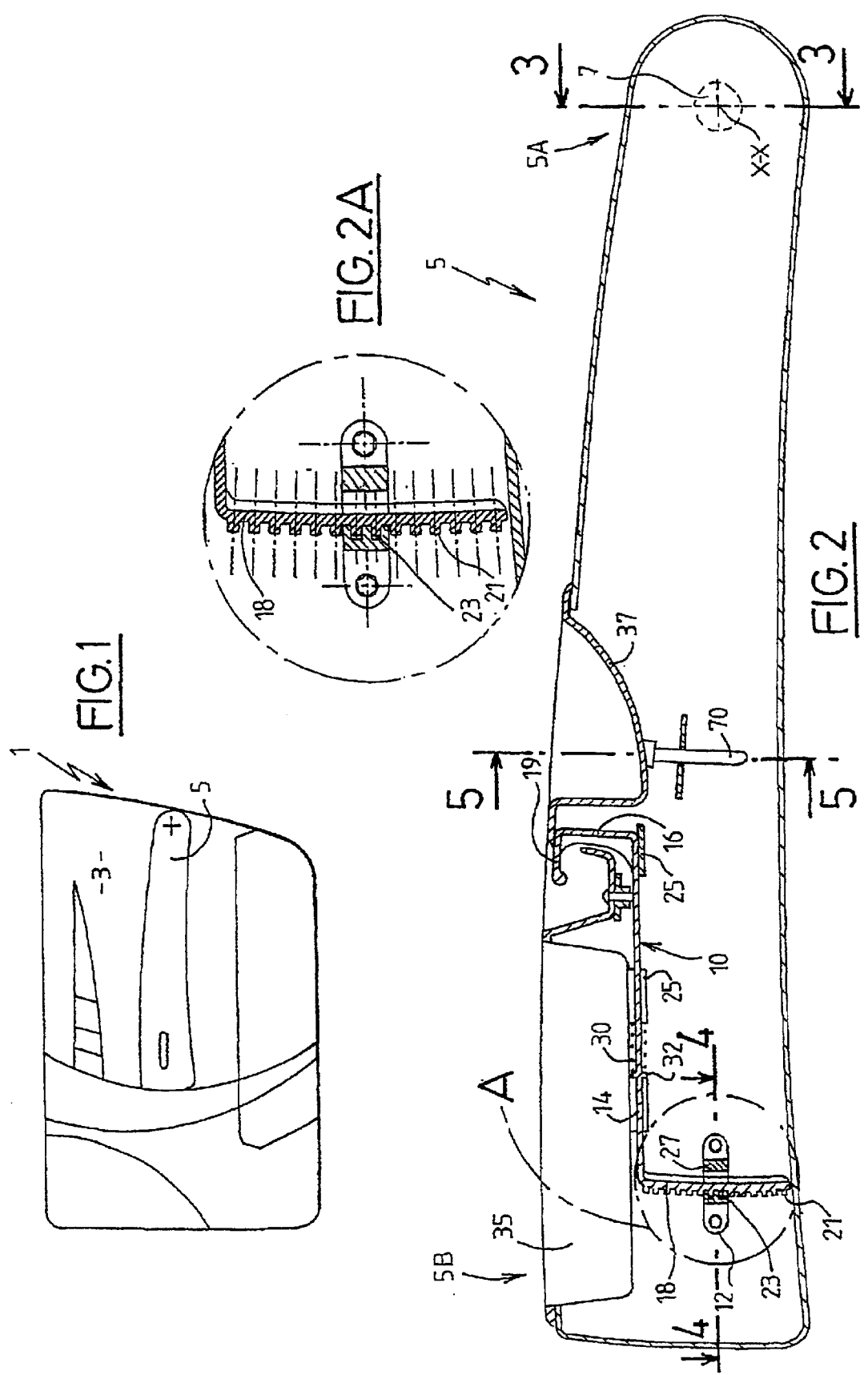

ADJUSTABLE ARMREST FOR MOTOR VEHICLE INSIDE PANEL

The invention relates to an armrest for an inside wall of a motor vehicle, in particular for a door, the armrest being of elongate shape along a main longitudinal axis, presenting a first end region along said axis, said first end region being connected to the wall by means of a connection member.

BACKGROUND OF THE INVENTION

In general, armrests secured to a vehicle wall are formed directly in the inside trim of the door, which trim is itself usually made as a rigid one-piece molding of plastics material, or else they are formed as separate pieces that are fixed rigidly and permanently to a wall.

Such designs do not enable the position of the armrest to be adjusted as a function of the user. As a result user comfort is not optimized.

In certain up-market vehicles, a central armrest is provided that is adjustable, often by means that are expensive and bulky and unsuitable for transposing to door armrests.

OBJECTS AND SUMMARY OF THE INVENTION

One of the main objects of the invention is to remedy those drawbacks and to provide a wall armrest which is adjustable in position so that a user can adjust the height of a rest portion relative to the wall. Another object is to provide an armrest of the above type which is simple to manufacture and to use.

To this end, the connection member defines a pivoting connection about a substantially horizontal transverse axis enabling the armrest to move angularly relative to the wall, and the armrest includes a locking member co-operating with a stop piece secured to the wall and adapted to hold the armrest in modifiable manner in a selected angular position.

According to other characteristics:

the stop piece and the locking member have complementary notches and teeth extending radially relative to the pivot axis, said notches and teeth presenting a plurality of relative positions and being coupled together or uncoupled by relative movement in substantially longitudinal translation;

the stop piece has at least one notch while the locking member has a plurality of teeth;

the stop piece is fixed relative to the wall and the locking member has a rod that is slidable relative to the armrest in a substantially longitudinal direction;

a return spring acting in the sliding direction of the rod connects said rod to the armrest in such a manner as to apply a force tending to couple together the notches and the teeth;

the armrest presents a hollow inside volume in which the stop piece and at least a portion of the locking member carrying the teeth extend, an end portion of the rod extending to a top face of the armrest so as to constitute a control member;

the connection member comprises a shaft mounted to turn in a complementary hole of a fixing piece secured to the wall, and a friction ring engaged on said shaft and bearing against an adjacent wall of the fixing piece so as to exert torque that resists pivoting of the armrest relative to the wall;

the friction ring is made of a flexible elastic material, in particular of rubber;

the armrest is secured to a handle which presents a circularly arcuate rod centered on the pivot axis of the armrest, the rod being engaged in a hole formed through a substantially horizontal arm of a force transmission piece secured to the wall so as to enable the rod to slide freely through the hole with a small amount of radial clearance; and the handle member is a hollow piece fitted to the armrest in a complementary recess, the rod extending downwards essentially in a recess within the armrest that is adapted to receive at least the perforated portion of the arm of the force transmission piece.

The invention also provides a motor vehicle including an armrest as described above.

BRIEF DESCRIPTION OF THE DRAWINGS

An embodiment of the invention is described below with reference to the accompanying drawings, in which:

FIG. 1 is a diagrammatic face view of the inside wall panel of a motor vehicle door fitted with an armrest of the invention;

FIG. 2 is a section view in a longitudinal midplane solely of the armrest shown in FIG. 1;

FIG. 2A shows a detail A of FIG. 2 on a larger scale;

DETAILED DESCRIPTION OF THE INVENTION

Figure 3:
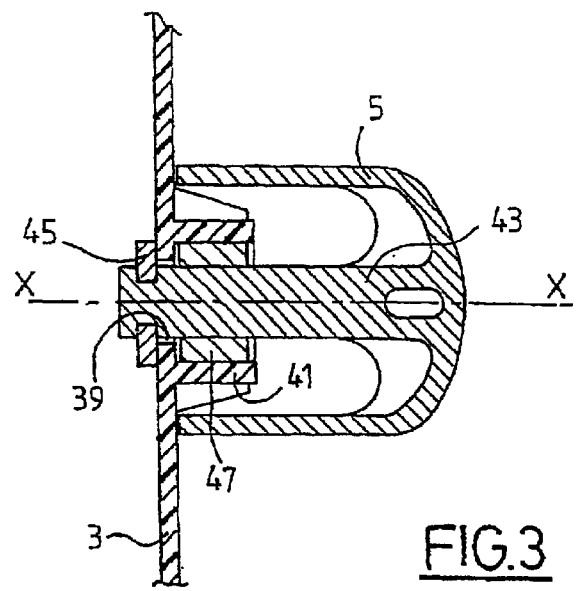
FIG. 3 is a section view on line 3—3 through the armrest and the trim panel shown in FIG. 1, on a larger scale.

FIG. 1 is a diagram of a motor vehicle door 1 covered on the inside of the vehicle by a trim panel 3 which is made, for example, out of rigid molded plastics material, and on this same side it carries an armrest 5 of elongate shape extending along a substantially horizontal axis that is parallel to the longitudinal axis of the vehicle.

FIG. 2 is a section through the armrest 5 in a longitudinal midplane containing said axis.

The armrest 5 is pivotally mounted to the trim panel 3 (which is secured to an inside wall of the door, not shown) via a connection member 7 situated in a rear end region 5A of the armrest 5. The connection member 7 defines a pivotal connection about a substantially horizontal transverse axis X—X such that the armrest 5 can move angularly relative to the door 1 and to the trim panel 3.

The armrest 5 also has a locking member 10 for holding the armrest 5 in a determined angular position about the axis X—X relative to the trim panel 3. The locking member 10 co-operates with a complementary stop piece 12 secured to the wall.

The locking member 10 is in the form of a rod 14 mounted to slide in a longitudinal direction relative to the armrest 5, provided at each end with a respective orthogonal branch 16, 18, the first branch 16 extending upwards and presenting a portion 19 flush with the top surface of the armrest to constitute a control piece accessible to a user, and the second branch 18 extending downwards. The second branch 18 presents a series of teeth 21 that are spaced apart vertically, being distributed along its height and facing rearwards towards a pair of complementary notches 23 formed in the stop piece 12.

The rod 14 is slidably mounted in a guide 25 secured to the armrest 5 so that the teeth 21 can be engaged in the corresponding notches 23 or disengaged therefrom, depending on whether the rod is moved longitudinally forwards or backwards respectively relative to the armrest.

As can be seen more clearly in FIG. 2A, the teeth 21 extend substantially radially relative to the pivot axis X—X of the armrest so that locking and unlocking can be performed regardless of the angular position of the armrest 5 about said axis X—X, i.e. regardless of which teeth 21 are facing the notches 23 prior to being moved into engagement.

Facing the notches 23, the stop piece 12 presents an abutment face 27 limiting the longitudinal stroke of the branch 18 in the stop piece 12.

Furthermore, the teeth 21 are disengaged from the notches 23 against a longitudinal return force exerted by a return spring 30 on the rod 14. One of the ends of the return spring 30 is secured to the guide 25 and its other end is secured to a collar 32 formed on the rod 14.

In the front end region 5B of the armrest 5, a control panel 35 is integrated in the armrest, this panel including control members, in particular electrical members for controlling accessories such as window-raising motors, seat actuators, etc.

In an intermediate region, on a top face of the armrest 5, there is disposed an armrest handle 37 enabling the door to be opened and closed. The handle 37 is in the form of a hollow cup inserted in a complementary recess formed in the rest surface of the armrest 5. It enables a user to take hold of the armrest by sliding the ends of the fingers therein, and to close the door from inside the vehicle by pulling on the handle 37.

FIG. 3 is a detail view of the pivoting connection between the armrest 5 and the trim panel 3 of the door wall. The trim panel 3 has a hole 39 surrounded by a tubular bush 41 integrally formed with the panel 3 and directed towards the inside of the vehicle. The armrest has a hollow inside volume in which there extends a cylindrical shaft 43 for co-operating with the hole 39 transversely and coaxially inside the bush 41. The free end of the shaft 43 is inserted into the hole 39 and projects beyond the wall formed by the trim panel 3, with the shaft 43 being prevented from moving in translation relative to the trim panel 3 by a lock washer 45 engaged in a groove in the shaft 43. A friction ring 47 is placed in the volume between the outside surface of the shaft 43 and the inside surface of the bush 41 so that the inside surface of the friction ring 47 bears against the shaft 43 and its outside surface bears against the inside face of the bush 41. The friction ring 47 is made of a flexible elastic material such as rubber so as to provide torque opposing pivoting of the shaft 43 and consequently the armrest 5 relative to the trim panel 3 about the axis X—X. The purpose of this disposition is to compensate in particular for the weight of the armrest whenever the locking member 10 is disengaged from the notches 23 so as to ensure firstly that the armrest does not drop down if the user does not hold it up, and secondly does not require too great a retention force.

Figure 4:
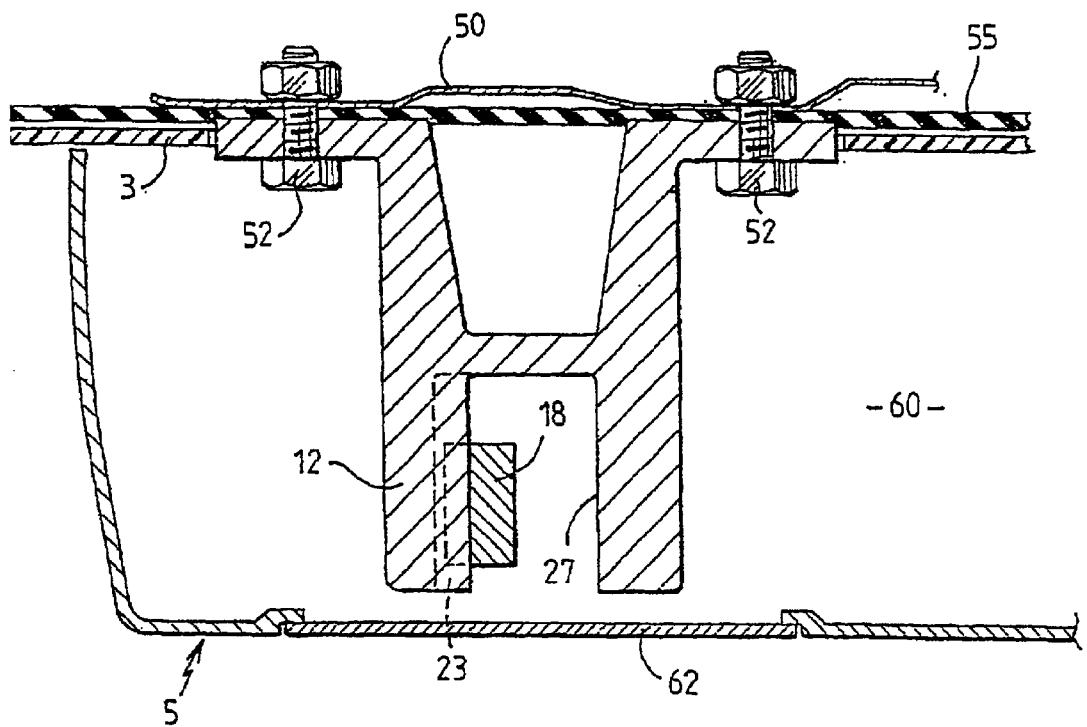
FIG. 4 is a section view on line 4—4 through the armrest and the trim panel shown in FIG. 1, on a larger scale.

FIG. 4 is a section view in a horizontal plane through the stop piece 12 in particular, and it can be seen that the stop piece 12 is formed by an H-shaped fitting whose branches are disposed on either side of the second branch 18 of the locking member 10 between the notches 23 and the abutment face 27. The stop piece 12 is secured to a metal fixing plate 50 which is itself fixed to the wall (not shown) of the door by means of bolts 52. A sealing sheet 55 is interposed in conventional manner between the trim panel 3 and the wall of the door, this sealing sheet 55 also being clamped between the fixing plate 50 and the stop piece 12.

Like the locking member 10, the stop piece 12 extends into the hollow inside volume 60 of the armrest 5, said inside volume 60 being accessible from inside the vehicle via a removable access hatch 62 mounted on a side face of the armrest 5 facing the stop piece 12 and the toothed branch 8 of the locking member 10. This access hatch 62 is for facilitating maintenance operations on the complete locking device or for enabling the bolts 52 to be undone so as to enable the armrest to be removed from the wall of the door.

Figure 5:
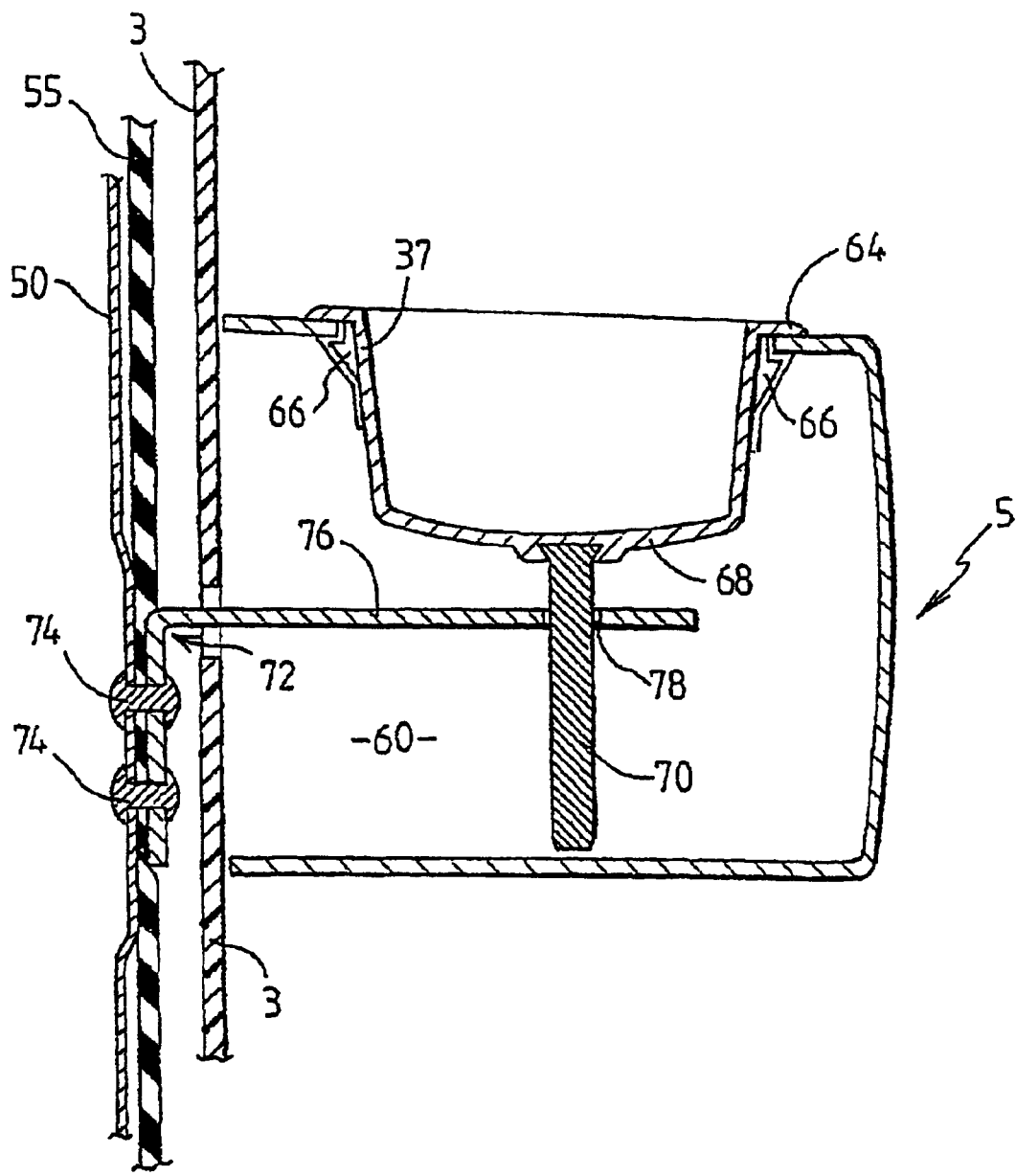
FIG. 5 is a section view on line 5—5 through the armrest and the trim panel shown in FIG. 1, on a larger scale.

FIG. 5 shows the armrest handle 37 in greater detail together with its device for being fixed relative to the wall of the door. In order to avoid deforming the armrest and suffering pull forces that are too great at its fixing points, provision is generally made for the forces exerted on the armrest handle 37 to be transmitted directly to the wall of the door. Since the angular position of the armrest of the invention is adjustable, it is necessary to provide an armrest handle 37 that can be moved together with the armrest 5 while simultaneously ensuring that pull forces are transmitted to the wall of the door regardless of the angular position of the armrest 5.

For this purpose, the armrest handle 37 is engaged as a force-fit in a complementary recess of the armrest 5 and is held in position by means of notches 66 and an abutment collar 64 bearing against the rest surface of the armrest. The handle 37 also has a bottom wall 68 secured to a circularly arcuate rod 70 centered on the pivot axis X—X of the armrest. This circularly arcuate shape for the rod 70 can be seen in FIG. 2. Furthermore, the metal fixing plate 50 is rigidly fixed to a force-transmitting bracket 72 by means of rivets 74 with the sealing sheet 55 being clamped between them. The bracket 72 has a substantially horizontal arm 76 in the form of a plate which is perforated in the vicinity of its free end. The corresponding hole 78 is in register with the rod 70 and is of dimensions suitable for allowing the rod 70 to slide freely but with small clearance.

It will be understood that the horizontal traction forces applied to the armrest handle 37 by a user are transmitted via the bracket 72 and the rivets 74 to the fixing plate 50 regardless of the angular position of the armrest 5. When the armrest is moved angularly, the rod 70 slides in one direction or the other along a circular arc centered on the pivot axis X—X of the armrest through the hole 78 in the horizontal arm 76 of the bracket 72. Horizontal traction forces are thus transmitted to the horizontal arm 76 when the rod 70 comes into abutment against an edge of the hole 78 following a small amount of deformation of the armrest 5.

The device as described above operates as follows: it will be understood that a user seeking to adjust the angular position of the armrest 5 relative to its pivot axis X—X needs to pull the control portion 19 rearwards so as to disengage the teeth 21 from the notches 23, to pivot the armrest 5 into a preferred position about the axis X—X, thereby placing the teeth 21 that correspond to the selected position into register with the notches 23, and to release the control portion 19 so as to allow the return spring 30 to return the rod 14 into a rest position, thereby causing the selected teeth 21 to engage in the notches 23. The armrest is then again locked in a position that is fixed relative to the pivot axis X—X.

The above-described invention presents the advantage of enabling the angular position of an armrest to be adjusted relative to a door or more generally to a wall of a vehicle by operations that can be performed quickly using a locking and selection device that implements mechanical parts that are simple and of low cost. The armrest can be adjusted to occupy a limited number of positions which are predetermined, thereby providing a good compromise between adjustment accuracy and the complexity of the means involved.

The disposition of the locking and selection member, and more particularly the position of the portion for controlling this member is highly ergonomic, the user having available on one surface of the armrest not only controls for electrical accessories located on the control panel, but also a mechanical control for the position of the armrest. The position of the armrest can thus be adjusted without the user making unnecessary movements away from the user's normal position.

What is claimed is:

1. An armrest for an inside wall of a motor vehicle, the armrest being of elongate shape along a main longitudinal axis, presenting a first end region along said axis, and comprising a connection member adapted to connect said first end region to the wall, wherein the connection member defines a pivoting connection about a substantially horizontal transverse axis enabling the armrest to move angularly relative to the wall, and wherein the armrest includes a locking member and a stop piece, said stop piece being adapted to be secured to the wall and said locking member being adapted to co-operate with said stop piece so as to hold the armrest in modifiable manner in a selected angular position.

2. A motor vehicle including an armrest according to claim 1.

3. An armrest according to claim 1, wherein the connection member comprises a shaft adapted to be mounted to turn in a complementary hole of a fixing piece secured to the wall, and a friction ring engaged on said shaft and adapted to bear against an adjacent wall of the fixing piece so as to exert torque that resists pivoting of the armrest relative to the wall.

4. An armrest according to claim 3, wherein the friction ring is made of a flexible elastic material, in particular of rubber.

5. An armrest according to claim 1, wherein the armrest is secured to a handle member which presents a circularly arcuate rod centered on the pivot axis of the armrest, the rod being adapted to engage a hole formed through a substantially horizontal arm of a force transmission piece secured to the wall so as to enable the rod to slide freely through the hole with a small amount of radial clearance.

6. An armrest according to claim 5, wherein the handle member is a hollow piece fitted to the armrest in a complementary recess, the rod extending downwards essentially in a recess within the armrest that is adapted to receive at least the perforated portion of the arm of the force transmission piece.

7. An armrest for an inside wall of a motor vehicle, the armrest being of elongate shape along a main longitudinal axis, presenting a first end region along said axis, and comprising a connection member adapted to connect said first end region to the wall, wherein the connection member defines a pivoting connection about a substantially horizontal transverse axis enabling the armrest to move angularly relative to the wall, and wherein the armrest includes a locking member and a stop piece, said stop piece being adapted to be secured to the wall and said locking member being adapted to co-operate with said stop piece so as to hold the armrest in modifiable manner in a selected angular position, wherein the stop piece and the locking member have complementary notches and teeth extending radially relative to the pivot axis, said notches and teeth presenting a plurality of relative positions and being coupled together or uncoupled by relative movement in substantially longitudinal translation.

8. An armrest according to claim 7, wherein the stop piece has at least one notch while the locking member has a plurality of teeth.

9. An armrest according to claim 7, wherein the locking member has a rod that is slidable relative to the armrest in a substantially longitudinal direction.

10. An armrest according to claim 9, wherein a return spring acting in the sliding direction of the rod connects said rod to the armrest in such a manner as to apply a force tending to couple together the notches and the teeth.

11. An armrest according to claim 9, wherein the armrest presents a hollow inside volume in which the stop piece and at least a portion of the locking member carrying the teeth extend, an end portion of the rod extending to a top face of the armrest so as to constitute a control member.

12. An armrest for a wall of a motor vehicle, the armrest comprising:

an elongate shelf having a longitudinal axis;

a pivot in said shelf adjacent to an end of said shelf and about which said shelf rotates;

a lock in said shelf spaced from said pivot and having plural notches, said lock being adapted to fix said shelf in plural positions defined by said plural notches relative to a wall of a motor vehicle; and a rod in said shelf that is movable generally parallel to the longitudinal axis to unfix said lock to permit rotation of said shelf about said pivot.

13. The armrest of claim 12, wherein said lock comprises a stop piece adapted to be fixed to a wall of a motor vehicle and a complementary piece that engages said stop piece to fix said shelf in said plural positions, wherein movement of said rod separates said stop piece from said complementary piece.

14. The armrest of claim 12, wherein said plural notches extend radially relative to said pivot.

* * * * *